US009001125B2

(12) United States Patent
Alvarez Cavazos et al.

(10) Patent No.: US 9,001,125 B2
(45) Date of Patent: Apr. 7, 2015

(54) OPERATION CHART RESCALING

(71) Applicant: Microsoft Corporation, Redmond, WA (US)

(72) Inventors: Francisco Alvarez Cavazos, Bothell, WA (US); Jonathan M. Class, Snohomish, WA (US); Jordi Mola, Redmond, WA (US); Guillermo Ortiz Peña, Kirkland, WA (US); Benjamin N. Truelove, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 13/761,999

(22) Filed: Feb. 7, 2013

(65) Prior Publication Data

US 2014/0218407 A1    Aug. 7, 2014

(51) Int. Cl.
*G06T 3/40* (2006.01)
*G06T 11/20* (2006.01)
*G06F 11/32* (2006.01)
*G06T 13/80* (2011.01)

(52) U.S. Cl.
CPC .............. *G06T 3/40* (2013.01); *G06F 11/328* (2013.01); *G06T 11/206* (2013.01); *G06T 13/80* (2013.01)

(58) Field of Classification Search
CPC ......... G06T 11/206; G06T 11/60; G06T 3/40; G06F 11/328
USPC ............ 345/660, 440, 440.1, 440.2; 715/772
See application file for complete search history.

(56) References Cited

U.S. PATENT DOCUMENTS

| | | | | |
|---|---|---|---|---|
| 5,684,507 A | * | 11/1997 | Rasnake et al. | 345/440.1 |
| 5,684,508 A | * | 11/1997 | Brilman | 345/440.1 |
| 2001/0055017 A1 | * | 12/2001 | Ording | 345/440 |
| 2004/0196286 A1 | * | 10/2004 | Guzik | 345/440 |
| 2007/0176933 A1 | * | 8/2007 | Culpi et al. | 345/440.2 |
| 2008/0256473 A1 | | 10/2008 | Chakra et al. | |
| 2008/0256474 A1 | | 10/2008 | Chakra et al. | |
| 2008/0307348 A1 | | 12/2008 | Jones et al. | |

OTHER PUBLICATIONS

"UV Irradiance and Temperature Measurement/Profiling Systems", Retrieved at <<http://www.eit.com/instruments/100200PWRB_A.pdf>>, Retrieved Date: Nov. 15, 2012, pp. 4.
"Transfer Status Window", Retrieved at <<http://support.sas.com/documentation/cdl/en/connref/61908/HTML/default/viewer.htm#tsw.htm>>, Retrieved Date: Nov. 15, 2012, pp. 3.

(Continued)

*Primary Examiner* — Jeffery A Brier
(74) *Attorney, Agent, or Firm* — Kevin Sullivan; Kate Drakos; Micky Minhas

(57) ABSTRACT

Techniques for operation chart rescaling are described. In at least some embodiments, an operations chart is provided that tracks various parameters for an operation. The operations chart can include visual indicia of operation parameters, such as an operation value indicator that indicates a current operation value. A progress indicator can also be included that provides a visual indication of operation progress. In response to a change in an operation value for the operations chart (e.g., a change in data rate), the operations chart can be rescaled to visually reflect the change in operation value. In at least some implementations, techniques are employed to smooth visual movement of chart elements during a rescaling operation.

20 Claims, 11 Drawing Sheets

(56) References Cited

OTHER PUBLICATIONS

"Real Time Bar Graph by Help of AJAX and CSS", Retrieved at <<http://swatelier.info/at/articles/ajaxPing.asp>>, Sep. 17, 2008, pp. 4.

"Pipe Viewer: Online Man Page", Retrieved at <<http://www.ivarch.com/programs/quickref/pv.shtml>>, Retrieved Date: Nov. 15, 2012, pp. 6.

"QFtp Class Reference", Retrieved at <<http://doc.qt.digia.com/qt/qftp.html>>, Retrieved Date: Nov. 11, 2012, pp. 15.

"Progress Bars", Retrieved at <<http://msdn.microsoft.com/en-us/library/windows/desktop/aa511486.aspx>>, Retrieved Date: Nov. 15, 2012, pp. 14.

* cited by examiner

OPERATION CHART RESCALING

BACKGROUND

Charts provide a useful tool for graphically representing data. For example, financial data associated with an enterprise can be represented via a line graph to provide a visual indication of financial aspects of the enterprise. Current techniques for implementing charts, however, typically have difficulty representing significant fluctuations in data values. For example, if data values fluctuate such that a current scale for a chart cannot represent the data values, the chart may instantly rescale to an appropriate scale to represent the fluctuating data values. Such rescaling can be difficult to detect and may go unnoticed by a user. Other techniques may simply utilize a sufficiently large scale such that significant fluctuations in data values do not exceed the scale. Such large scales, however, have difficulty representing finer details that may occur with smaller fluctuations in data values.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for operation chart rescaling are described. In at least some embodiments, an operations chart is provided that tracks various parameters for an operation. The operations chart can include visual indicia of operation parameters, such as an operation value indicator that indicates a current operation value. A progress indicator can also be included that provides a visual indication of operation progress.

In response to a change in an operation value and/or an amount of operation task to be completed (e.g., a change in data rate, a change in an amount of data to be moved, and so on), an operations chart can be rescaled to visually reflect the change. For instance, a value indicator and/or a progress indicator can be repositioned in the operations chart to reflect the rescaling of the chart.

In at least some implementations, techniques are employed to smooth visual movement of chart elements during a rescaling operation. For instance, movement of chart elements (e.g., a value indicator and/or a progress indicator) can have a controlled visual acceleration, speed, and/or deceleration during rescaling. Thus, a speed with which chart elements move during rescaling may not correspond directly to a change in operation value. This can provide for a more pleasing user experience when operation values change during an ongoing operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for operation chart rescaling are described. In at least some embodiments, an operations chart is provided that tracks various parameters for an operation. For instance, the operation can include a file operation, such as a file move operation, a file download operation, a file upload operation, and so forth. Parameters for the operation can include a data rate for the operation, progress of the operation (e.g., how much of the operation has been completed), and so forth. The operations chart can include visual indicia of the operation parameters, such as an operation value indicator that indicates a current operation value. A progress indicator can also be included that provides a visual indication of operation progress.

In response to a change in an operation value and/or an amount of operation task to be completed (e.g., a change in data rate, a change in an amount of data to be moved, and so on), an operations chart can be rescaled to visually reflect the change. For instance, consider an example implementation where a current operations chart scale is such that a change in operation value causes a value indicator for the chart to be positioned towards a top or bottom of the chart. In such an implementation, the operations chart can be rescaled such that the value indicator is repositioned towards a center region of the chart.

In at least some implementations, techniques are employed to smooth visual movement of chart elements during a rescaling operation. For instance, an operation value may change quickly, e.g., over a few milliseconds. A chart rescaling that occurs based on the change in operation value may be controlled such that a user is given a visual sense of the rescaling operation. For instance, movement of chart elements (e.g., a value indicator and/or a progress indicator) can have a controlled visual acceleration, speed, and/or deceleration during rescaling. Thus, a speed with which chart elements move during rescaling may not correspond directly to a change in operation value. This can provide for a more pleasing user experience when operation values change during an ongoing operation.

Having presented an overview of example implementations in accordance with one or more embodiments, consider now an example environment in which example implementations may by employed.

Example Environment

Figure 1:
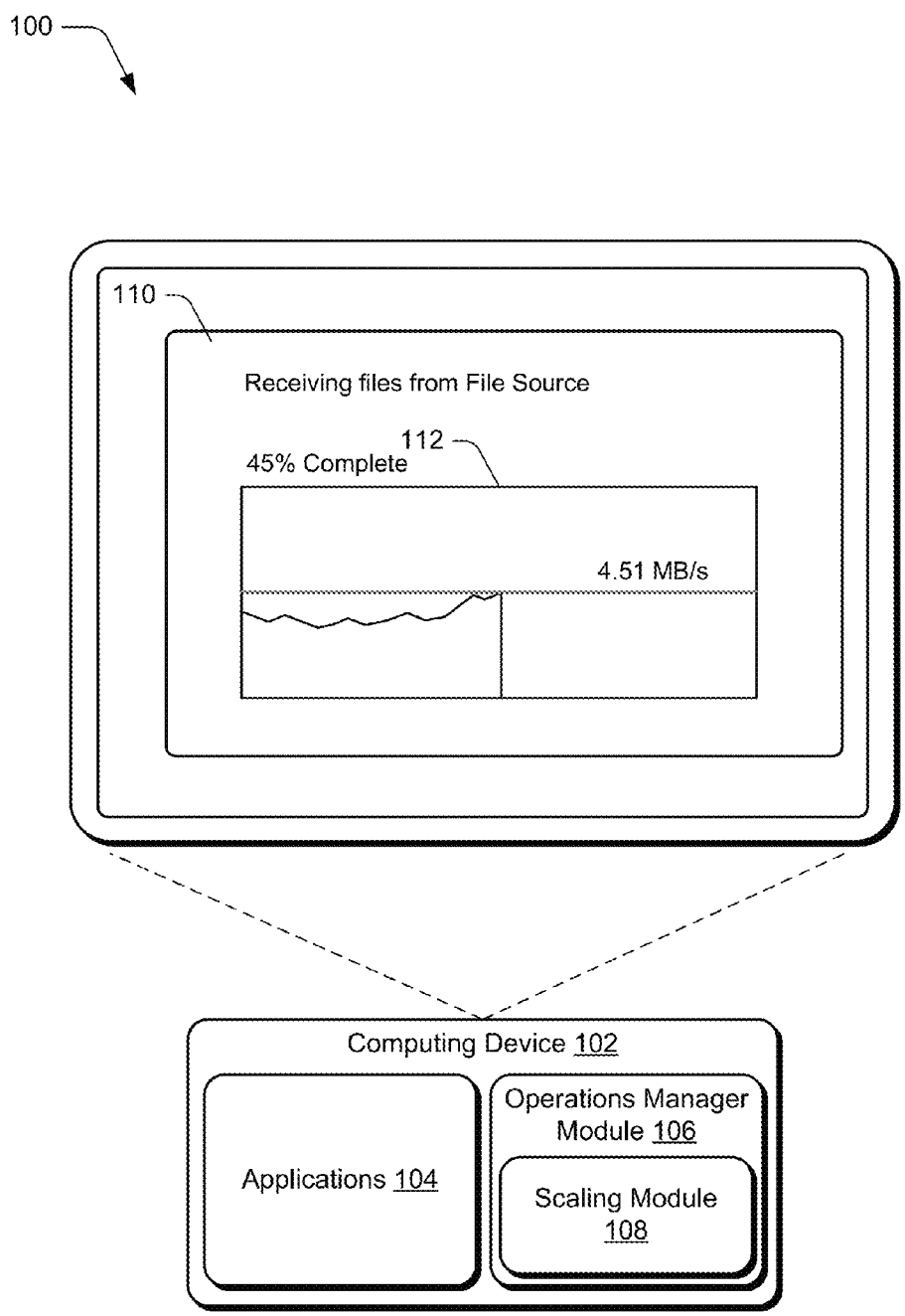
FIG. 1 is an illustration of an environment in an example implementation that is operable to employ techniques discussed herein.

FIG. 1 is an illustration of an environment 100 in an example implementation that is operable to employ techniques for operation chart rescaling described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 12.

Thus, the computing device 102 may range from a full resource device with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes applications 104, which are representative of functionalities to perform various tasks via the computing device 102. Examples of the applications 104 include a word processor application, an email application, a content editing application, a web browsing application, and so on.

The computing device 102 further includes an operations manager module 106 that is representative of functionality to manage various operations for the computing device 102, the applications 104, and so on. Examples of such operations include file operations, such as copying files, moving files, deleting files, downloading and/or uploading files, recycling files, renaming files, changing file attributes (e.g., changes to file metadata), and so on. Other examples of operations include diagnostic operations, update operations, security operations, and so forth. A wide variety of other operations may be managed via the operations manager module 106 in accordance with the claimed embodiments.

Further included as part of the computing device 102 is a scaling module 108, which is representative of functionality to scale graphical elements displayed via the computing device 102. For example, consider an operations user interface (UI) 110, which includes an operations chart 112 that provides a visual indication of status for various operations. The operations chart 112, for instance, can indicate a rate at which an operation is currently occurring. The operations chart 112 also indicates progress of an operation, e.g., what percentage of an operation is completed and/or how much of the operation remains to be completed.

According to various embodiments, the scaling module 108 can adjust various graphical elements of the operations chart 112 to provide a visual indication of changing and resulting scale. The scaling module 108 can also respond to changes in operation values (e.g., speed, bandwidth, and so forth) by rescaling the operations chart 112 according to techniques discussed herein.

Figure 2:
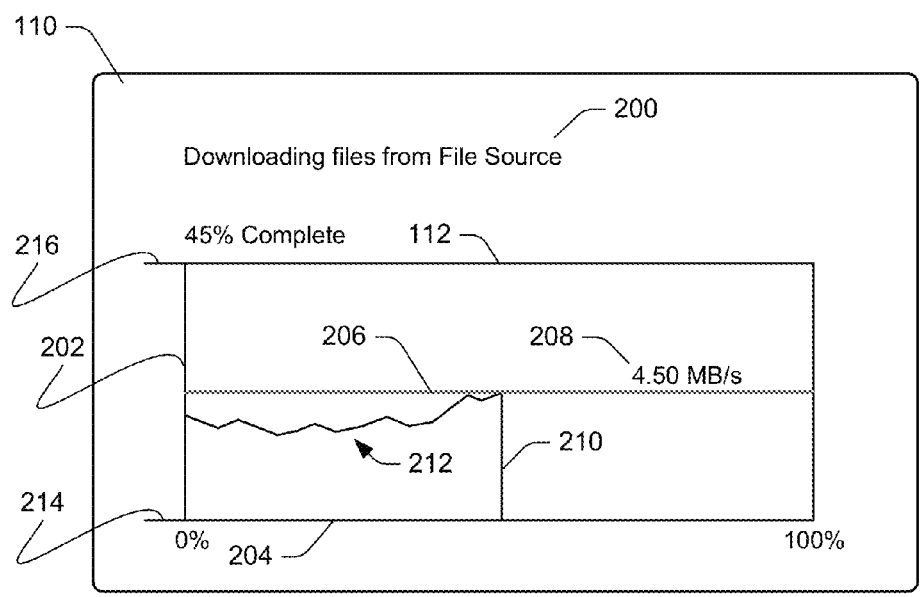
FIG. 2 illustrates an example operations user interface in accordance with one or more embodiments.

FIG. 2 illustrates aspects of the operations UI 110 and the operations chart 112 in more detail, in accordance with one or more embodiments. The operations UI 110 includes a description portion 200, which includes an indication of a particular operation being tracked via the operations chart 112. In this example, the description portion 200 indicates that a status of a file download operation is being tracked. This operation is presented for purpose of example only, and a wide variety of different operations and/or resources can be tracked in accordance with the claimed embodiments.

The operations chart 112 includes a range axis 202 and a progress axis 204. The range axis 202 represents a range of values for a particular operation, such as rate values. For instance, with reference to a file download operation, the range axis can represent a range of file download rates. However, the range axis 202 can be employed to indicate a wide variety of different values for a variety of different operation types, such as acceleration, volume, physical dimensions (e.g., length, width, and so on), and so forth.

The progress axis 204 is a linear representation of progress values for an operation. For instance, the leftmost portion of the progress axis 204 can correspond to 0% completion of an operation. The rightmost portion of the progress axis 204 can correspond to 100% completion of an operation. With reference to a file download operation, the progress axis 204 can start at 0% completion of the download and terminate at 100% completion of the download. These progress values are presented for purpose of example only, and a variety of different progress values can be employed in accordance with various embodiments.

A value mark 206 is also illustrated, which provides a graphical indication of a current value for an operation that is being tracked. For instance, the value mark 206 can correspond to a particular value or range of values from the range axis 202. In this example, the value mark 206 indicates a current download speed for a file download operation. The value mark 206 can move upward and downward relative to the range axis 202 to visually indicate changing operation values.

Positioned adjacent to the value mark 206 is a value caption 208, which represents a text and/or numeral-based representation of a current value for an operation. The value caption 208, for instance, can describe a value represented by the value mark 206.

The operations chart 112 further includes a progress mark 210 and a history line 212. The progress mark 210 indicates a current operation progress, such as with reference to progress values specified by the progress axis 204. For instance, the progress mark 210 can be positioned at various points along the progress axis 204 to indicate different progress points for an operation.

The history line 212 is representative of historical values for an operation, such as historical values from the range axis 202 and/or the progress axis 204. For instance, the history line 212 can connect data points that correspond to values that occur temporally prior to the progress mark 210. Thus, in at least some implementations, the progress mark 210 can traverse from left to right along the progress axis 204 as an operation progresses. Further, as the progress mark 210 traverses the progress axis 204, the history line 212 can indicate previous operation values, e.g., previous values from the range axis 202 and/or the progress axis 204.

The operations chart 112 includes a range minimum 214 and a range maximum 216, which specify ranges of values for operations. For instance, the range minimum 214 can correspond to a minimum value for the range axis 202, and the range maximum 216 can correspond to a maximum value for the range axis 202. In at least some embodiments, the range minimum 214 can correspond positionally to the progress axis 204, and the range maximum 216 can correspond positionally to the upper border of the operations chart 112.

As detailed elsewhere herein, the range minimum 214 and/or the range maximum 216 can be employed to determine whether to rescale the operations chart 112 in accordance with various embodiments. Further, in at least some embodiments, chart rescaling refers to a change in the values and/or range of values represented by the range axis 202.

In this example, the current operation value for the example file download operation (e.g., as indicated by the value mark 206 and/or the value caption 208) is 4.5 megabytes per second (MB/s). Further, the range minimum 214 corresponds to zero (0) MB/s, and the range maximum 216 corresponds to 9 MB/s. These values are provided as examples only, and a wide variety of different values and/or units can be employed in accordance with various embodiments.

Having described an example environment in which the techniques described herein may operate, consider now a discussion of some example implementation scenarios in accordance with one or more embodiments.

Example Implementation Scenarios

The following discussion describes some example implementation scenarios for providing visual representation of chart scaling in accordance with one or more embodiments. In portions of the following discussion, reference will be made to the environment 100 of FIG. 1, the operations UI 110, and the operations chart 112.

Figure 3:
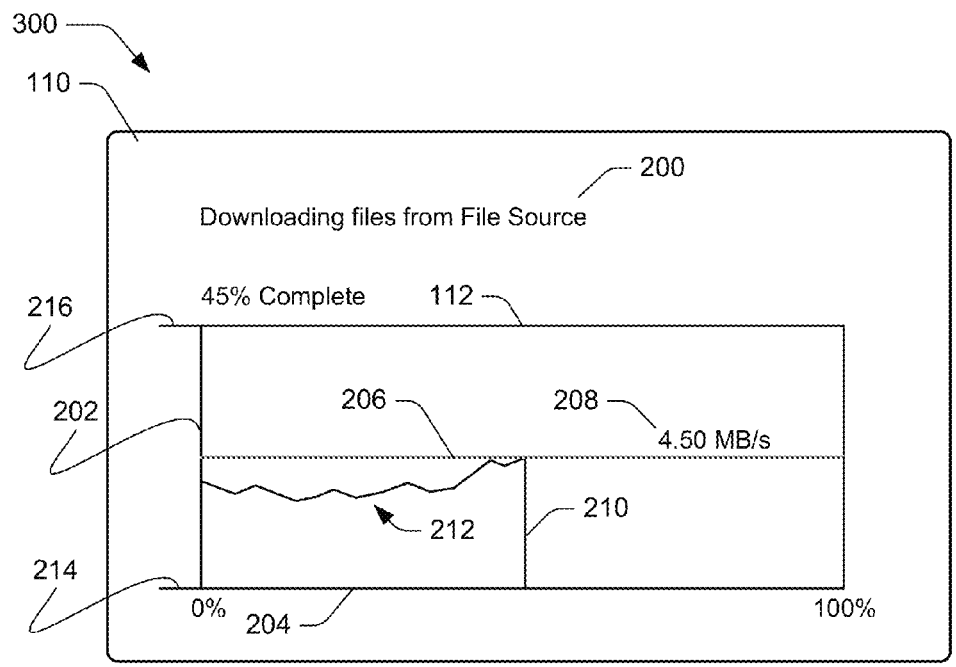
FIG. 3 illustrates an example implementation scenario in accordance with one or more embodiments.

FIG. 3 illustrates an example implementation scenario, general at 300. The operations UI 110 and the operations chart 112 are included as part of the scenario 300. In the scenario 300, a file download operation is occurring and the operations chart 112 indicates various parameters of the file download operation. For instance, the value mark 206 and the value caption 208 indicate a current download speed for the download operation. The progress mark 210 indicates progress of the file download operation, e.g., what percentage of the download operation has occurred. As the file download operation progresses, various aspects of the operations UI 110 and the operations chart 112 can be adjusted to accommodate changing parameters of the operation. For example, consider the following implementation scenario.

Figure 4:
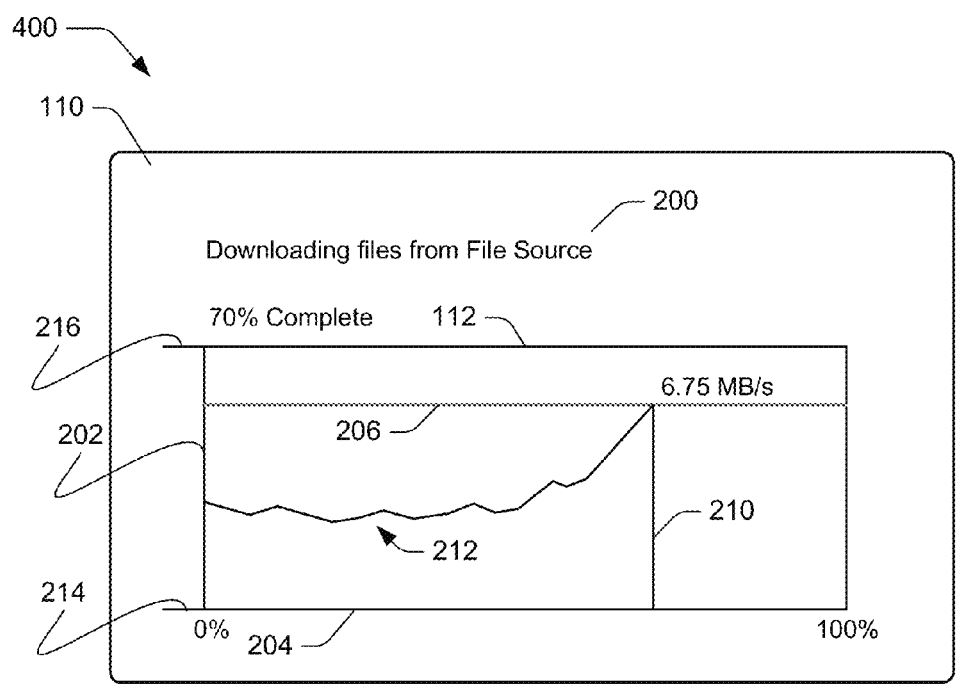
FIG. 4 illustrates an example implementation scenario in accordance with one or more embodiments.

FIG. 4 illustrates an example implementation scenario, general at 400. In at least some embodiments, the scenario 400 represents a continuation of the scenario 300. The scenario 400 includes the operations UI 110 and the operations chart 112. In the scenario 400, the download operation has progressed as indicated by movement of the progress mark 210 along the progress axis 204. Further, the download speed has increased to 6.75 MB/s. Thus, the value mark 206 moves upward in the operations chart 112 to indicate the increase in download speed.

According to at least some embodiments, a threshold value is specified for the operations chart 112. When an operation value meets or exceeds the threshold value, the operations chart 112 can be rescaled to visually accommodate the change in operation value. The threshold value, for instance, can be defined with reference to a particular operation value, such as speed, volume, acceleration, distance, and so forth.

The threshold value may also be specified based on visual aspects of the operations chart 112, such as distance (e.g., number of pixels) between the value mark 206 and/or the value caption 208, and the upper boundary and/or lower boundary of the operations chart 112.

Further to the scenario 400, the operation value as indicated by the download speed has exceeded a threshold value. In response, adjustments to visual aspects of the operations chart 112 can occur, such as rescaling.

Figure 5:
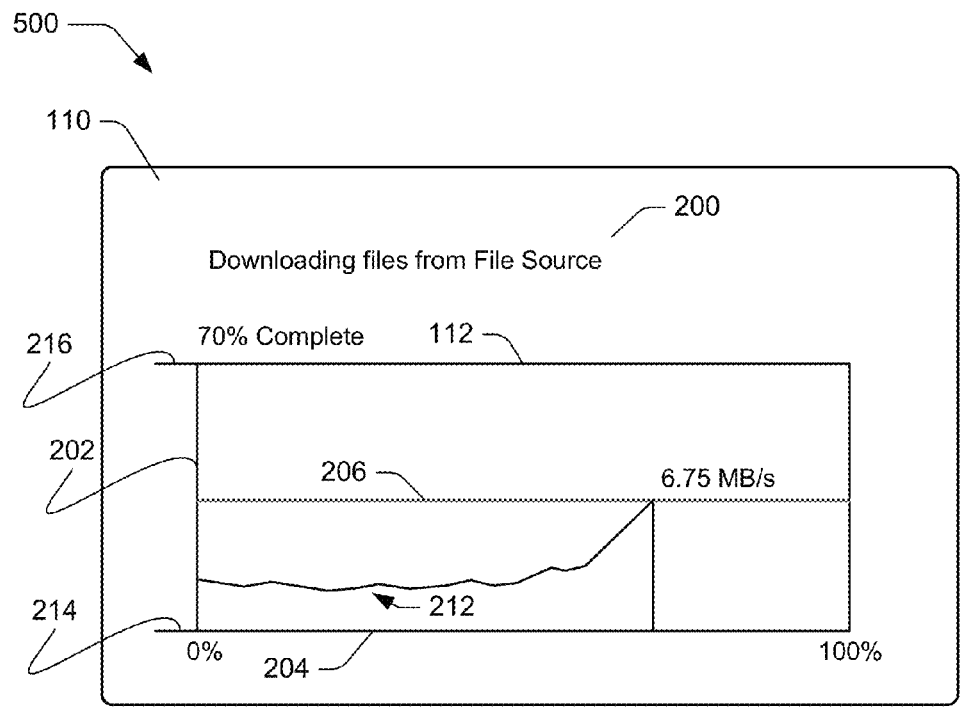
FIG. 5 illustrates an example implementation scenario in accordance with one or more embodiments.

FIG. 5 illustrates an example implementation scenario, general at 500. In at least some embodiments, the scenario 500 represents a continuation of the scenarios 300 and 400, discussed above.

Responsive to exceeding the threshold operation value as discussed above in scenario 400, the operations chart 112 is rescaled to accommodate the increased download speed. For instance, the range of operation values represented by the range axis 202 (e.g., between the range minimum 214 and the range maximum 216) is increased. The value mark 206 is repositioned in the operations chart 112 to indicate the current operation value with reference to the rescaled chart. Further, the history line 212 is reconfigured (e.g., moved downward and/or compressed) such that the historical operation values are accurately reflected in the rescaled operations chart 112. As detailed below, movement of visual elements of the operations chart 112 (e.g., the value mark 206, the history line 212, and so forth) in response to chart rescaling may not be synchronous with a change in operation value. For instance, movement of the visual elements can be visually smoothed to provide an enhanced visual experience for users during a rescaling operation.

While embodiments are generally discussed herein with reference to increasing chart scale, this is not limiting on the claimed subject matter. For instance, embodiments may also be employed to downscale a chart, e.g., to decrease the scale values represented by a chart. Further, the charts illustrated herein are presented for purposes of example only, and a wide variety of different charts and/or data representations can be employed in accordance with the claimed embodiments.

Figure 6:
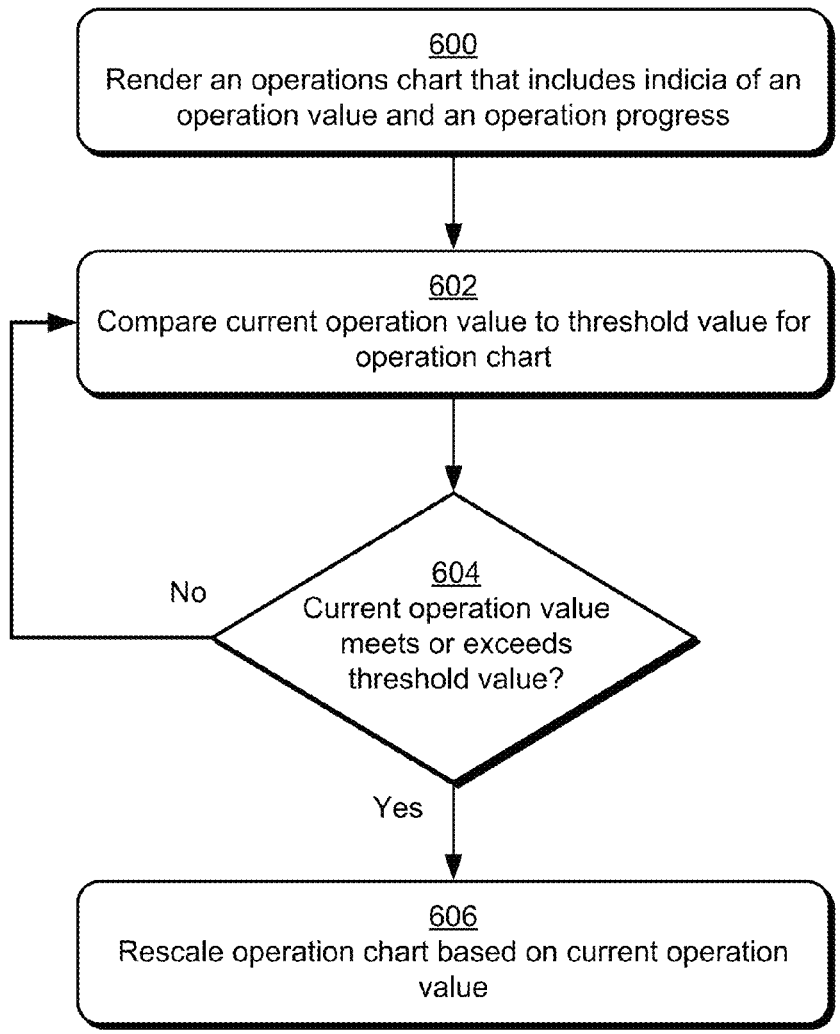
FIG. 6 is a flow diagram that describes steps in a method in accordance with one or more embodiments.

FIG. 6 is a flow diagram that describes steps in a method in accordance with one or more embodiments. The method presents an example technique for chart rescaling in accordance with one or more embodiments.

Step 600 renders an operations chart that includes indicia of an operation value and an operation progress. For instance, an operations chart can be visually rendered that includes visual indicia of various operation parameters, such as operation progress, operation speed, operation rate, and so forth.

Step 602 compares a current operation value to a threshold value for an operations chart. As referenced above, the threshold value can be based on a variety of different factors. For instance, the threshold value can correspond to a display distance (e.g., a number of pixels) between a value indicator (e.g., a value line, a value caption, and forth) and a chart perimeter. As another example, the threshold value can correspond to a particular operation value and/or range of operation values. As yet a further example, the threshold value can correspond to a particular display portion of an operations chart, such as a number of pixels above and/or below a center of an operations chart.

Step 604 determines whether the current operation value meets or exceeds the threshold value. If the current operation value does not meet or exceed the threshold value ("No"), the method returns to step 602. If the current operation value meets or exceeds the threshold value ("Yes"), step 606 rescales the operations chart based on the current operation value. Various details and implementations for chart rescaling are discussed herein.

Figure 7:
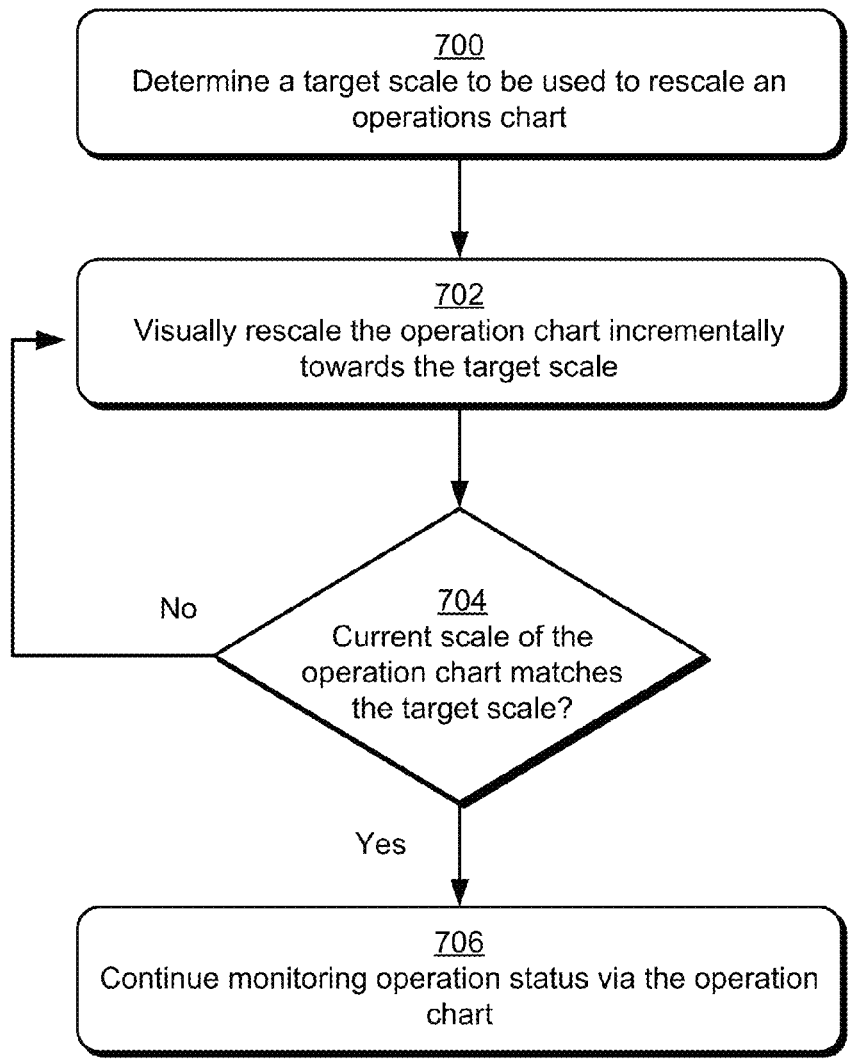
FIG. 7 is a flow diagram that describes steps in a method in accordance with one or more embodiments.

FIG. 7 is a flow diagram that describes steps in a method in accordance with one or more embodiments. The method presents a more detailed implementation of chart rescaling in accordance with one or more embodiments. For instance, the method presents an example implementation of step 606 of FIG. 6, discussed above.

Step 700 determines a target scale to be used to rescale an operations chart. The target scale can be determined based on a variety of different factors. For instance, the target scale can be calculated such that a value indicator for a current operation value will be positioned in a particular region of an operations chart when the chart is rescaled. In at least some implementations, the upper value for the target scale can be calculated as a multiple of a current operation value, such as twice the current operation value, or a percentage value less than twice the current operation value. For instance, the upper value for the target scale can be 1.95 times the current operation value, 1.90 times the current operation value, and/or any other suitable multiple of the current operation value.

Step 702 visually rescales the operations chart incrementally towards the target scale. The scale, for instance, can be increased or decreased by a specified amount. As detailed below, the scale can be incrementally increased or decreased according to a variety of different rescaling algorithms. For example, the scale can be visually increased or decreased relative to a display frame rate and/or refresh rate, such as specified in frames per second (FPS), hertz (Hz), and so forth. For ease of discussion, the term "frame" is used herein to refer to subdivisions of display operations such as frame rendering, display refresh, and so forth. Additionally or alternatively, the scale can be changed based on a timer, such as every 50 milliseconds (ms) and/or any other suitable time interval. Thus, incremental rescaling can occur periodically relative to a variety of different forms of periodicity, such as frames, time intervals, and so forth.

According to at least some embodiments, a scale increment can be specified and/or calculated that is less than a difference between a current chart scale and a target scale. The scale increment can be based on units for operation values, such as data rate for a data move operation, e.g., a file upload and/or download. Thus, a difference between a current operations chart scale and a target scale can be subdivided into scale increments such that an operations chart can be rescaled over individual increments based on a frame interval.

An operations chart can be visually rescaled (e.g., re-rendered according to an updated scale value) by the scale increment and according to a frame interval (e.g., every 5 frames) until the chart scale reaches the target scale. Thus, though an actual operation value (e.g., download speed, file transfer speed, and so forth) may change abruptly, visual rescaling of an operations chart for the operation may lag behind the actual change in operation value. Further details concerning incremental chart rescaling are discussed below.

Chart rescaling typically causes corresponding movement of an operation value indicator, such as the value mark 206 introduced above. For example, as a chart is visually rescaled, an operation value indicator moves within the chart based on the rescaling to a position within the chart that corresponds to a current operation value. Thus, techniques for chart rescaling discussed herein can apply to value indicators to affect ways in which the value indicators move within a chart during rescaling.

Step 704 ascertains whether the current scale of the operations chart matches the target scale. If the current scale does not match the target scale ("No"), the method returns to step 702. If the current scale matches the target scale ("Yes"), step 706 continues monitoring operation status via the operations chart.

In at least some embodiments, a chart rescaling algorithm can be employed to smooth the movement of various visual aspects of an operations chart during rescaling. Employing the chart rescaling algorithm involves considering dimensions and positions of visual chart elements. For instance, consider the following illustration.

Figure 8:
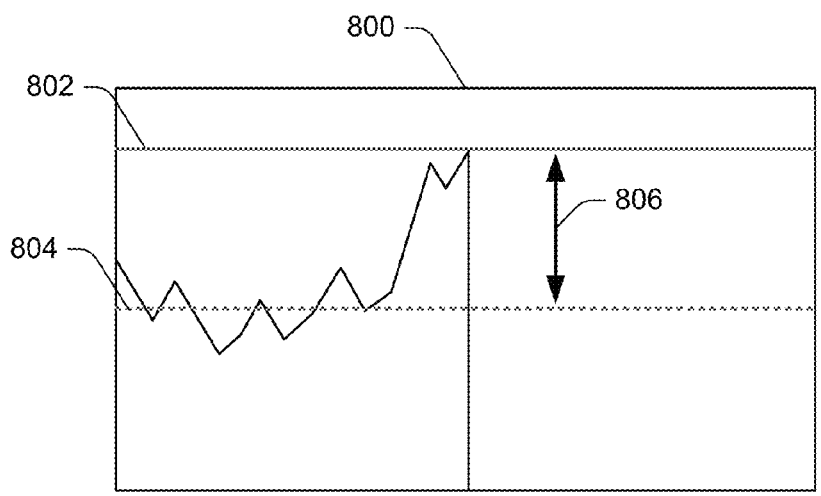
FIG. 8 illustrates an example operations chart in accordance with one or more embodiments.

FIG. 8 illustrates an example operations chart 800 in accordance with one or more embodiments. The operations chart 800 includes a value indicator 802, which is positioned to correspond to a current operation value for a current scale of the operations chart 800. According to techniques discussed herein, the current operation value (as indicated by the position of the value indicator 802) is determined to meet or exceed a threshold value. Thus, the operations chart 800 is to be rescaled.

Further illustrated is a target indicator location 804, which corresponds to a target location for the value indicator 802 after the operations chart 800 is rescaled according to embodiments discussed herein. For instance, when the operations chart 800 is rescaled to a target scale, the value indicator will move from its current location to the target indicator location 804 to indicate a current operation value at the target scale.

Between the value indicator 802 and the target indicator location 804 is a rescale distance 806, which corresponds to a distance that the value indicator 802 will move during rescaling to be positioned at the target indicator location 804. The rescale distance 806 can be measured in a variety of ways, such as in pixels (e.g., a number of pixels), coordinate distance (e.g., a distance between different x and/or y values in a coordinate system), vector distance, and so forth.

According to embodiments discussed herein, the rescale distance 806 can be leveraged to perform various calculations for determining aspects of chart rescaling, such as a speed with which a chart is rescaled, a speed at which a value indicator moves during rescaling, and so forth. For instance, consider the following example method.

Figure 9:
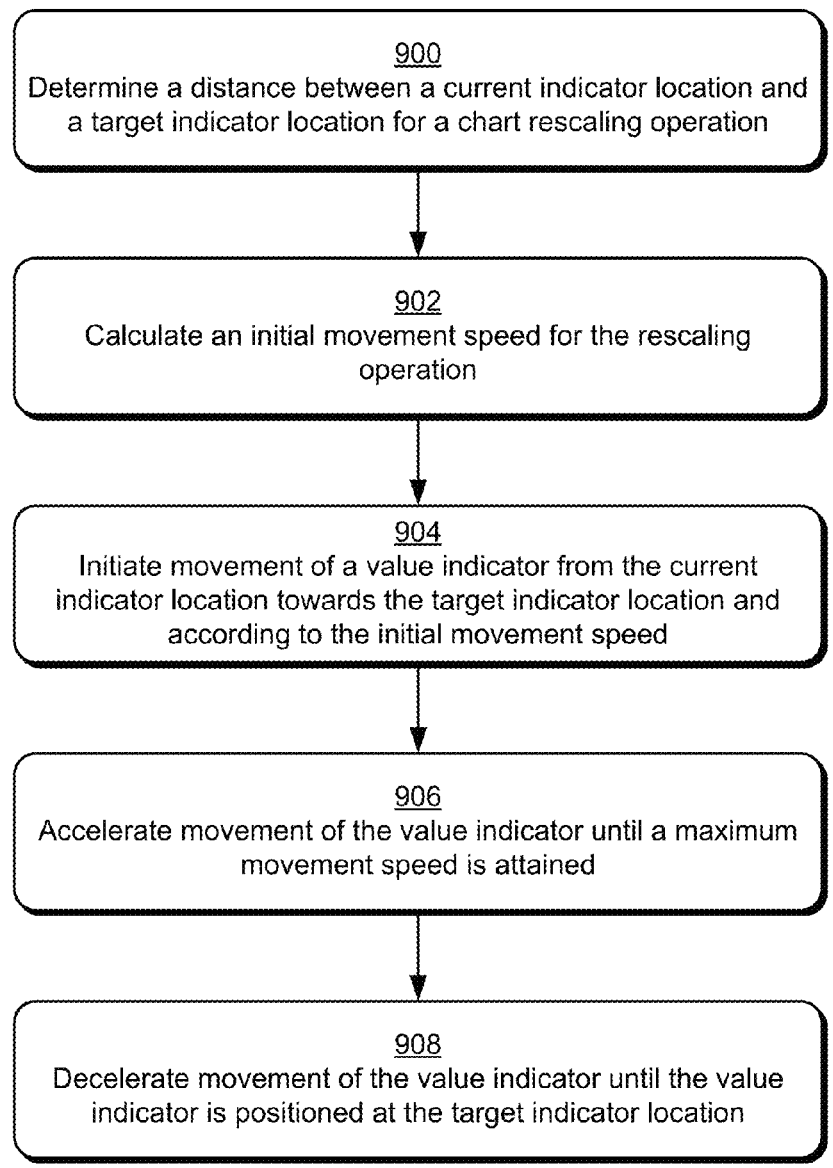
FIG. 9 is a flow diagram that describes steps in a method in accordance with one or more embodiments.

FIG. 9 is a flow diagram that describes steps in a method in accordance with one or more embodiments. In at least some embodiments, the method describes an example movement of an operation value indicator (e.g., the value mark 206) during a chart rescaling operation. For instance, the method presents an example implementation of step 702 of FIG. 7, discussed above.

Step 900 determines a distance between a current indicator location and a target indicator location for a chart rescaling operation. For example, the rescale distance 806 discussed above can be calculated.

Step 902 calculates an initial movement speed for the rescaling operation. The initial movement speed, for instance, can correspond to a speed that a value indicator begins moving during a rescaling operation.

In at least some embodiments, the initial movement speed can be calculated as: $v_i = \sqrt{a|d|}$, where "$v_i$" is the initial movement speed, "a" is a specified acceleration for object movement, and "d" is the rescale distance for the rescale operation.

According to one or more implementations, an acceleration value can be pre-specified for movement of visual aspects of an operations chart during a rescale operation. The acceleration value can be specified, for instance, in terms of pixels per time unit (e.g., pixels/ms$^2$), in terms of pixels per frame (e.g., pixels/frame$^2$), and so forth. An example acceleration value is 0.5 pixels/frame$^2$. However, a wide variety of other acceleration values may be employed in accordance with the claimed embodiments.

Step 904 initiates movement of a value indicator from the current indicator location towards the target indicator location and according to the initial movement speed. The value indicator 802, for instance, can begin movement from its current location towards the target indicator location 804 at the calculated initial movement speed.

Step 906 accelerates movement of the value indicator until a maximum movement speed is attained. The movement of the value indicator 802, for instance, can be accelerated based on the specified acceleration value discussed above. Further, a maximum speed value (e.g., a "speed limit") can be specified, such as in pixels/second, frames/second, and so forth. An example of a maximum speed value is 1 pixel/frame. However, a wide variety of other maximum speed values may be employed in accordance with the claimed embodiments.

Step 908 decelerates movement of the value indicator until the value indicator is positioned at the target indicator location. The movement can be decelerated, for instance, according to a pre-specified deceleration value and in response to the maximum movement speed being attained. The specified deceleration value can be indicated in any suitable unit, such as pixels/ms$^2$, pixels/frame$^2$, and so on. An example deceleration value is 0.5 pixels/frame$^2$. However, a wide variety of other deceleration values may be employed in accordance with the claimed embodiments.

In at least some embodiments, repositioning of a value indicator at a target indicator location corresponds to a rescaling operation for an operations chart. For instance, movement of the value indicator to a target indicator location can be indicative of an ongoing chart rescaling. Although an actual operation value may change quickly, various techniques (e.g., the method discussed above) may be employed to smooth a visual transition of visual chart elements to reflect an updated operation value and/or chart scale.

Progress Resealing

In at least some embodiments, a chart can be rescaled to reflect a change in progress values. For instance, with reference to the operations chart 112, the progress axis 204 can be rescaled to reflect a change in operation progress. Consider for example the following implementation scenario.

Figure 10:
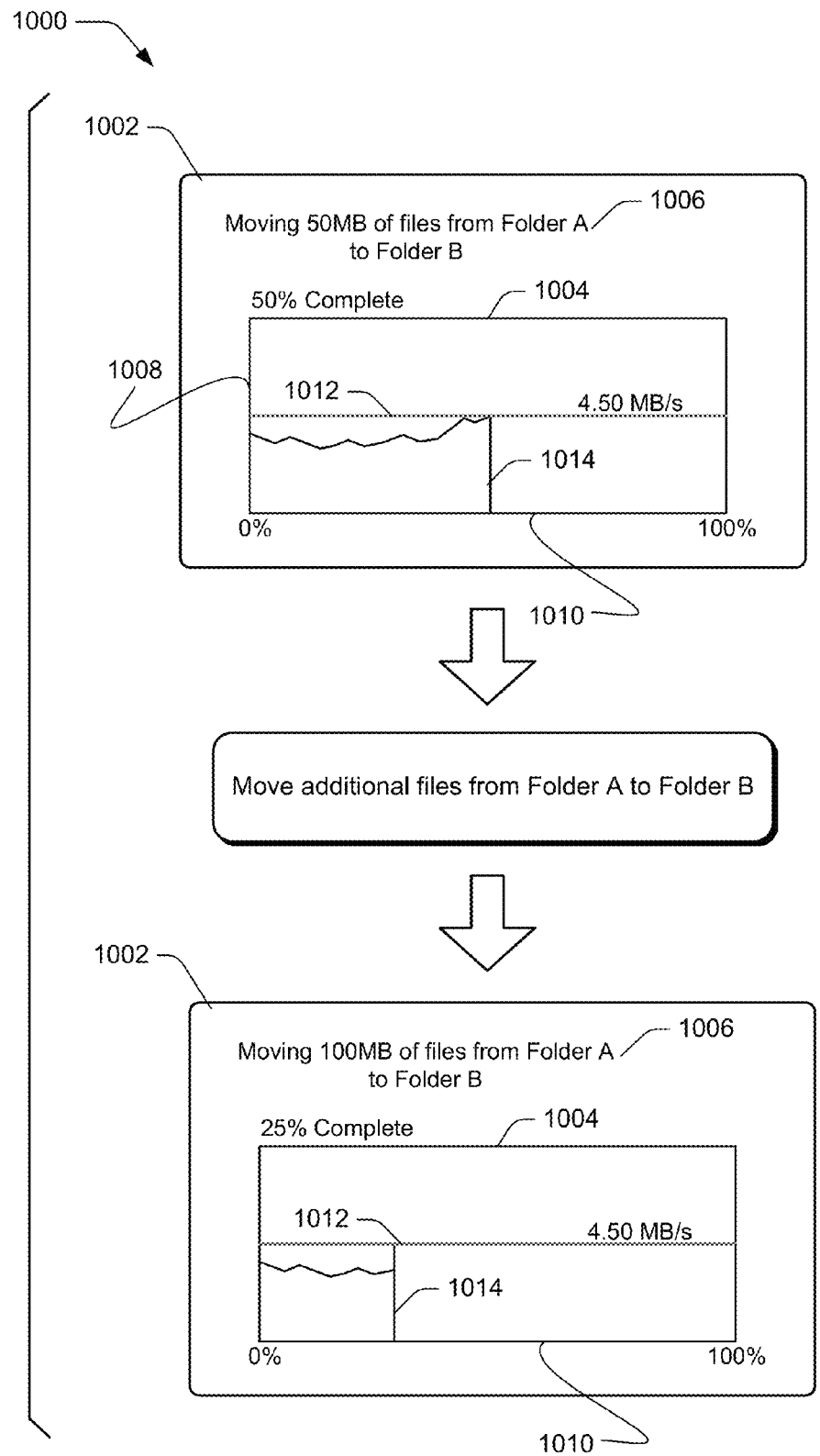
FIG. 10 illustrates an example implementation scenario in accordance with one or more embodiments.

FIG. 10 illustrates an example implementation scenario 1000 in accordance with one or more embodiments. Included as part of the scenario 1000 are an operations UI 1002 and an operations chart 1004. As indicated by a description portion 1006 of the operations UI 1002, the operations chart 1004 tracks progress and data rate for a file move operation. For instance, a range axis 1008 represents a range of data rate values for the file move operation, and a progress axis 1010 represents a range of progress values for the file move operation.

The operations chart 1004 further includes a value mark 1012 that indicates an operation value (e.g., a current operation value) for the file move operation. A progress mark 1014 indicates a progress of the file move operation, e.g., with reference to a range of progress values indicated by the progress axis 1010. As indicated in the upper portion of the scenario 1000, the file move operation involves moving 50 MB of file from a "Folder A" to a "Folder B." Further, the file move operation is 50% complete.

Continuing to the center portion of the scenario 1000 and while the initial file move operation is in progress, a user indicates that additional files are to be moved from Folder A to Folder B. For instance, a user can drag files from Folder A to Folder B, such as via graphical representations of the folders and the files.

Continuing to the lower portion of the scenario 1000, the operations chart 1004 is rescaled based on the additional files to be moved. For instance, consider that an additional 50 MB of files are to be moved from Folder A to Folder B. The move operation of the additional 50 MB of files is conflated with the original move operation such that a total move operation of 100 MB is indicated. Thus, in the rescaled operations chart 1004, the description portion 1006 is updated to indicate the new amount of data to be moved. Further, the progress axis 1010 is rescaled based on the new total amount of data, e.g., up to 100% of 100 MB of data.

As part of the rescaling, the progress mark 1014 is repositioned relative to the progress axis 1010 to indicate the new progress value, e.g., 25% of 100 MB of data files has been moved. Thus, embodiments discussed herein can be employed to scale a variety of different chart values, such as operation values, progress values, combinations thereof, and so forth. For instance, at least some embodiments can enable a single implementation of an operations chart to rescale both its indication of operation values (e.g., the range axis 1008) and its indication of progress values, e.g., the progress axis 1010.

While the scenario 1000 is discussed with reference to progress rescaling based on an increase in operation task(s) to completion, embodiments may also be employed to rescale based on a decrease in operation task. For instance, consider a scenario where a user deletes a file from a file move queue during a file move operation. Thus, fewer files and less data are to be moved as part of the file move operation. An operations chart for the file move operation can be rescaled based on the decrease in total data to completion. For instance, with reference to the scenario 1000 discussed above, the operations chart 1004 can be rescaled such that the progress mark 1014 is moved to the right along the progress axis 1010 to indicate the change in scale. In at least some embodiments, rescaling of progress elements of a progress chart (e.g., the progress axis 101, the progress mark 1014, and so forth) can occur based on rescaling techniques and algorithms discussed elsewhere herein.

Figure 11:
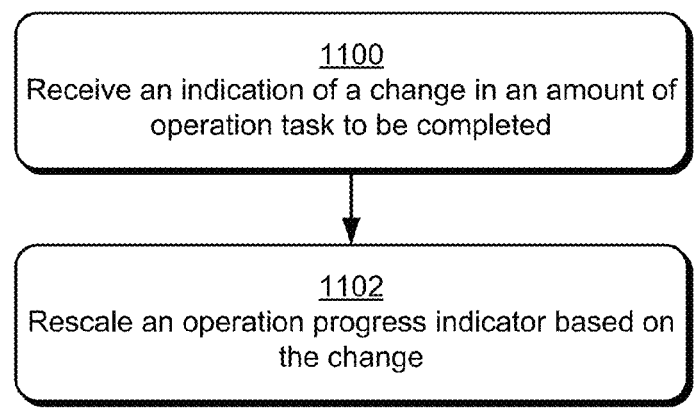
FIG. 11 is a flow diagram that describes steps in a method in accordance with one or more embodiments.

FIG. 11 is a flow diagram that describes steps in a method in accordance with one or more embodiments. Step 1100 receives an indication of a change in an amount of operation task to be completed. The change, for instance, can be with reference to an amount of data to be moved, such as files to be copied, deleted, uploaded, downloaded, and so forth. Further, the change can be and increase or a decrease in an amount of task.

Step 1102 rescales an operation progress indicator based on the change. For instance, a progress axis, progress mark, and/or other indicia of operation progress can be rescaled to indicate the change. In at least some embodiments, rescaling a progress indicator can include movement of a progress indicator from a position relative to a current scale, to a new position relative to a new scale.

Other Embodiments

Embodiments discussed herein may be employed for purposes other than file management operations, such as those discussed above. For instance, embodiments can be utilized to track values and/or progress for various other types of tasks, such as product development, construction, data processing (e.g., compiling tasks), sociological phenomena (e.g., population movement), product shipping, and so forth. Thus, charts for such tasks can be rescaled according to embodiments discussed herein to reflect changes in various task-related parameters.

Example System and Device

Figure 12:
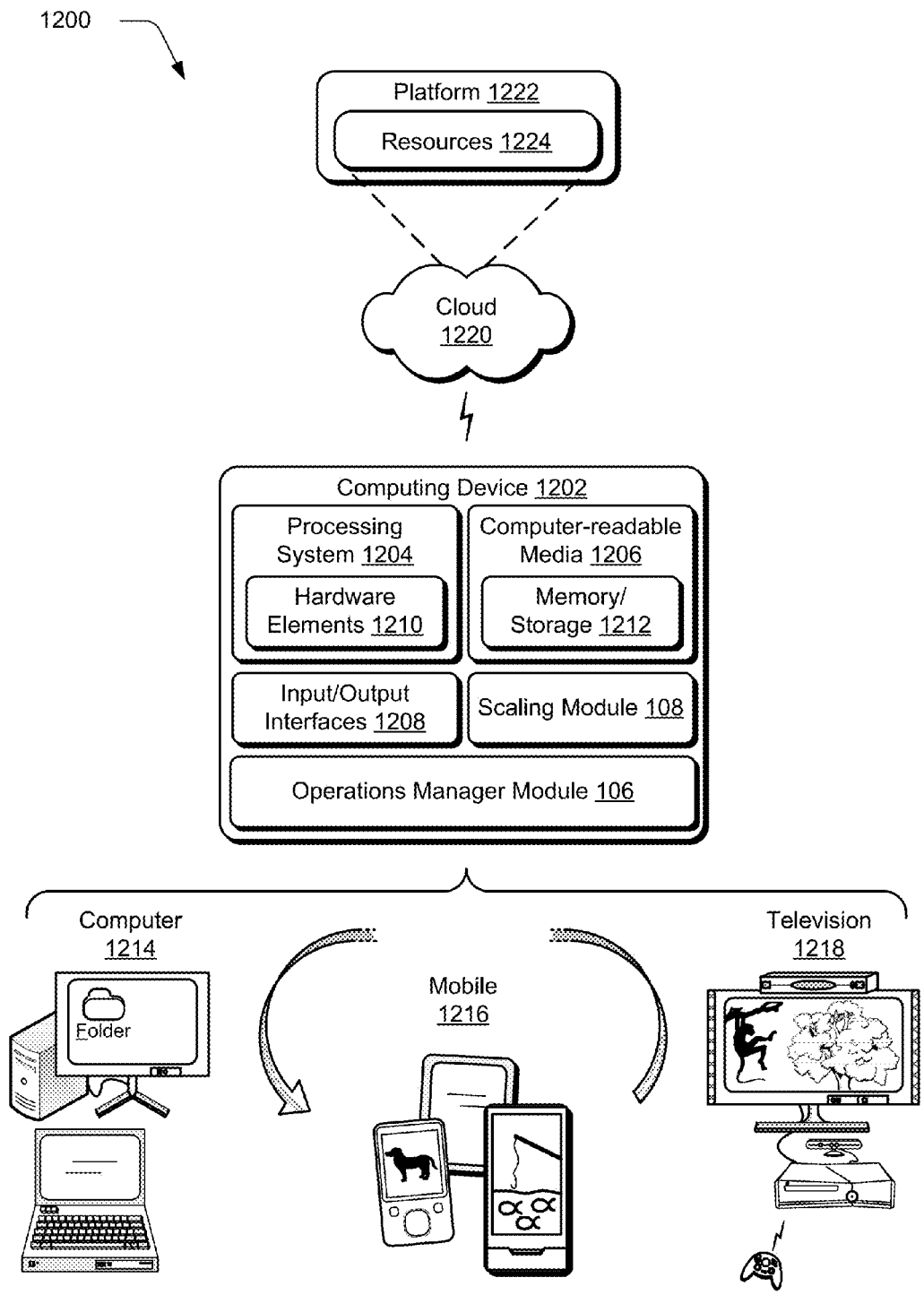
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the computing device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the operations manager module 106 and/or the scaling module 108 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for operation chart rescaling are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A device comprising:
   at least one processor; and
   one or more computer-readable storage media including instructions stored thereon that, responsive to execution by the at least one processor, cause the device to perform operations comprising:
      rendering an operations chart that includes indicia of an operation value and an operation progress for an operation;
      comparing a current operation value to a threshold value for the operations chart;
      determining whether the current operation value meets or exceeds the threshold value; and
      rescaling the operation chart responsive to a determination that the current operation value meets or exceeds the threshold value.

2. A device as recited in claim 1, wherein the operation comprises a file operation including at least one of a file download operation, a file upload operation, a file move operation, a file copy operation, a file recycle operation, a file delete operation, a file rename operation, or a file attribute change operation, and wherein the operation value comprises a rate at which the file operation is occurring.

3. A device as recited in claim 1, wherein the threshold value is based on a threshold distance between the indicia of the operation value and a visual boundary of the operations chart.

4. A device as recited in claim 1, wherein the indicia of the operation progress indicates a percentage of the operation that has been performed.

5. A device as recited in claim 1, wherein the operations chart includes a history line that indicates historical operation values for the operation, and wherein said rescaling comprises adjusting the history line based on a target scale to which the operations chart is rescaled.

6. A device as recited in claim 1, wherein said rescaling comprises:
   determining a target scale to be used to rescale the operations chart; and
   visually rescaling the operations chart incrementally towards the target scale.

7. A device as recited in claim 1, wherein the operations further comprise:
   receiving an indication of a change in an amount of operation task to be completed for the operation; and
   rescaling the operations chart based on the indication of the change.

8. A computer-implemented method, comprising:
   determining a target scale to be used to rescale an operations chart;
   visually rescaling the operations chart incrementally towards the target scale;
   ascertaining whether the current scale of the operations chart matches the target scale; and
   responsive to a determination that the current scale does not match the target scale, continuing to visually rescale the operations chart incrementally towards the target scale until the current scale of the operations chart matches the target scale.

9. A method as described in claim 8, wherein said determining occurs responsive to:
   comparing a current operation value to a threshold operation value for the operations chart; and
   determining that the operations chart is to be rescaled based on a determination that the current operation value meets or exceeds the threshold operation value.

10. A method as described in claim 8, wherein said determining occurs responsive to a change in an amount of operation task to be completed for an operation, and the target scale corresponds to an amount of operation progress.

11. A method as described in claim 8, wherein said visually rescaling comprises rescaling the operations chart by a pre-specified scale increment until the current scale of the operations chart matches the target scale.

12. A method as described in claim 8, wherein said visually rescaling causes movement of a value indicator to a location in the operations chart that corresponds to a current operation value.

13. A method as described in claim 8, wherein said visually rescaling comprises:
   initiating movement of a value indicator for the operations chart from a current indicator location towards a target indicator location and according to an initial movement speed;
   accelerating movement of the value indicator until a maximum movement speed is attained; and
   responsive to the maximum movement speed being attained, decelerating movement of the value indicator until the value indicator is positioned at the target indicator location.

14. A method as described in claim 13, wherein the initial movement speed is calculated based on a distance between the current indicator location and the target indicator location.

15. One or more computer-readable storage media comprising instructions stored thereon that, responsive to execution by a computing device, cause the computing device to perform operations comprising:
   determining a distance between a current indicator location and a target indicator location for a chart rescaling operation of an operations chart;
   calculating an initial movement speed for the rescaling operation based on the distance;
   initiating movement of a value indicator from the current indicator location towards the target indicator location and according to the initial movement speed;
   accelerating movement of the value indicator until a maximum movement speed is attained; and
   responsive to the maximum movement speed being attained, decelerating movement of the value indicator until the value indicator is positioned at the target indicator location.

16. One or more computer-readable storage media claim 15, wherein the distance between the current indicator location and the target indicator location comprises a pixel distance.

17. One or more computer-readable storage media claim 15, wherein the chart rescaling operation occurs responsive to an operation value for a value indicator meeting or exceeding a threshold operation value for the operations chart.

18. One or more computer-readable storage media claim 15, wherein at least one of the initial movement speed or the maximum movement speed is specified in pixels per frame.

19. One or more computer-readable storage media claim 15, wherein said accelerating is based on a pre-specified acceleration value.

20. One or more computer-readable storage media claim 15, wherein said decelerating is based on a pre-specified deceleration value.

* * * * *